US007667861B2

(12) United States Patent
Umetani et al.

(10) Patent No.: US 7,667,861 B2
(45) Date of Patent: Feb. 23, 2010

(54) IMAGE FORMING APPARATUS

(75) Inventors: Yoshinobu Umetani, Nara (JP); Kenji Tanaka, Nara (JP); Kazuhiro Mizude, Kyoto (JP); Hideyuki Hiro, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 821 days.

(21) Appl. No.: 11/437,995

(22) Filed: May 18, 2006

(65) Prior Publication Data

US 2006/0263112 A1 Nov. 23, 2006

(30) Foreign Application Priority Data

May 20, 2005 (JP) ............................ 2005-148122

(51) Int. Cl.

*G06K 15/00* (2006.01)
*G06F 3/12* (2006.01)
*H04N 1/40* (2006.01)
*G03G 15/00* (2006.01)
*G03G 15/16* (2006.01)
*G03G 17/04* (2006.01)
*G03G 17/06* (2006.01)
*B41J 2/435* (2006.01)
*G01D 15/14* (2006.01)

(52) U.S. Cl. ...................... 358/1.12; 358/2.1; 358/1.13; 358/1.16; 399/28; 399/43; 399/46; 399/66; 399/131; 347/224

(58) Field of Classification Search ................ 358/1.15, 358/1.16, 1.9, 2.1, 1.12, 1.13, 1.18, 302; 399/299, 38, 45, 53, 66, 39, 43, 46, 54, 82, 399/131, 159, 306; 347/229, 234, 248, 224

See application file for complete search history.

(56) References Cited

U.S. PATENT DOCUMENTS 6,029,023 A * 2/2000 Munemori et al. ............ 399/66

(Continued)

FOREIGN PATENT DOCUMENTS

JP 11-034438 2/1999

(Continued)

*Primary Examiner*—Twyler L Haskins
*Assistant Examiner*—Jonathan R Beckley
(74) *Attorney, Agent, or Firm*—David G. Vonlin; Steven M. Jensen; Edwards Angell Palmer & Dodge LLP

(57) ABSTRACT

An image forming apparatus including: a plurality of image data acquisition units for respectively acquiring one or more page(s) of image data; a color or monochrome determining unit for determining whether each of the acquired pages is in color or in monochrome; an image forming unit for performing image formation of each page switchably using a monochrome-only image forming function for a monochrome page or a color and monochrome image forming function for a color page and a monochrome page; an image data switching unit for sequentially selecting and arranging the acquired pages of image data one by one so that the image formation of each page is performed in the order of selection; a function selecting unit for selecting either one of the monochrome-only and color and monochrome image forming functions for each of the arranged pages on the basis of the determination result made by the color or monochrome determining unit; and a control unit for controlling the image forming unit so that image formation of each page is performed using the selected image forming function.

4 Claims, 9 Drawing Sheets

U.S. PATENT DOCUMENTS

| | | | | |
|---|---|---|---|---|
| 6,108,510 | A * | 8/2000 | Nakane | 399/303 |
| 6,198,899 | B1 * | 3/2001 | Takahashi et al. | 399/303 |
| 6,385,427 | B1 * | 5/2002 | Nakane | 399/303 |
| 7,046,938 | B2 * | 5/2006 | Yamamoto et al. | 399/82 |
| 7,106,981 | B2 * | 9/2006 | Hashimoto et al. | 399/25 |
| 7,123,849 | B2 * | 10/2006 | Ishii et al. | 399/28 |
| 7,149,439 | B2 * | 12/2006 | Hirata et al. | 399/29 |
| 7,164,873 | B2 * | 1/2007 | Yamamoto et al. | 399/82 |
| 7,200,350 | B2 * | 4/2007 | Agata et al. | 399/223 |
| 7,365,865 | B2 * | 4/2008 | Kidani et al. | 358/1.13 |
| 7,392,007 | B2 * | 6/2008 | Nakano et al. | 399/345 |
| 7,447,452 | B2 * | 11/2008 | Burry et al. | 399/50 |

FOREIGN PATENT DOCUMENTS

| | | |
|---|---|---|
| JP | 11-258886 | 9/1999 |
| JP | 2000-029266 | 1/2000 |
| JP | 2001-305818 | 11/2001 |
| JP | 2001-305822 | 11/2001 |
| JP | 2003-195699 | 7/2003 |
| JP | 2003-207970 | 7/2003 |
| JP | 2003-237191 | 8/2003 |
| JP | 2004-109798 | 4/2004 |

* cited by examiner

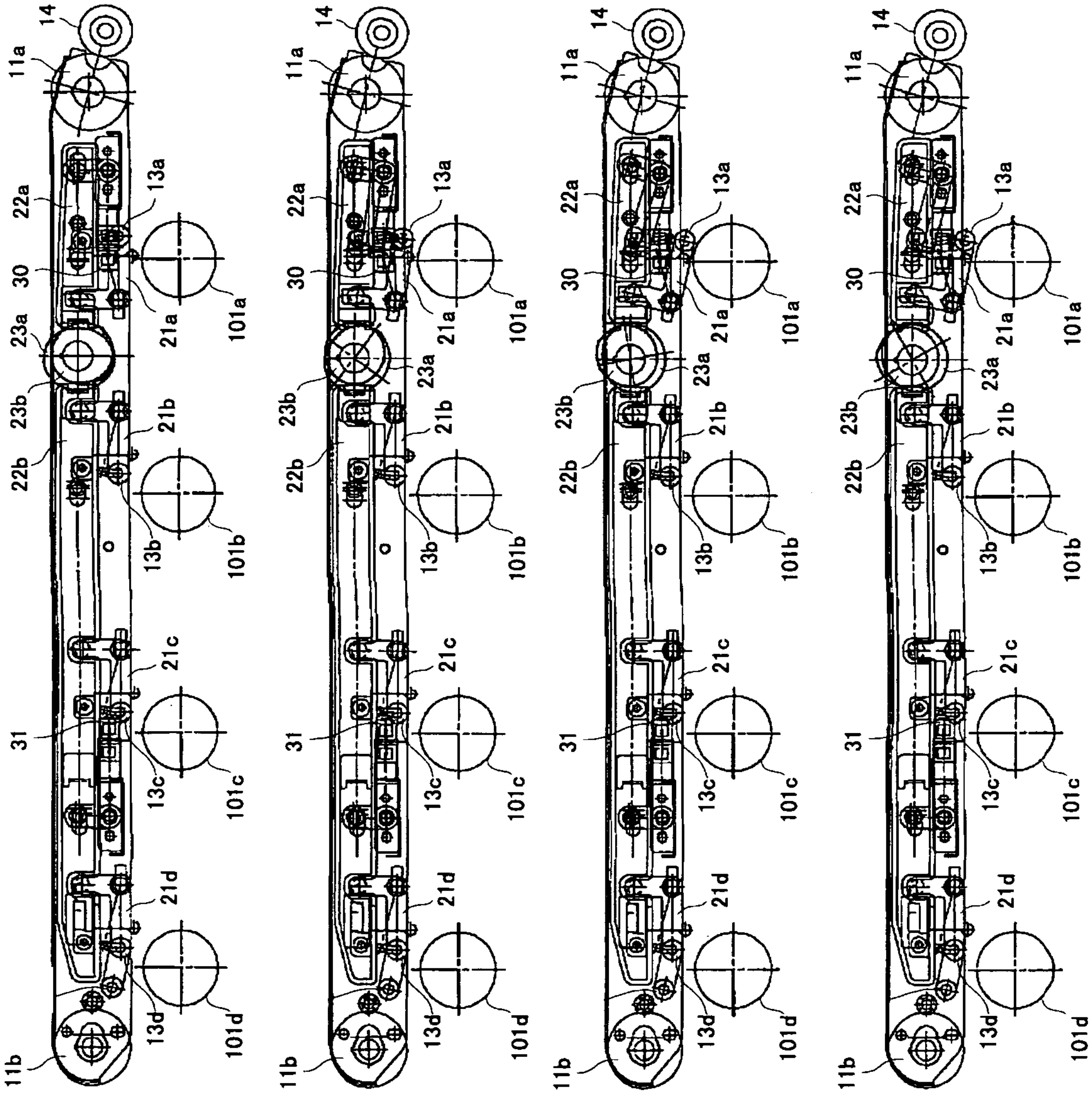
FIG.7A INITIAL STATE
CAM ROTATION ANGLE 0°
FIG.7B MONOCHROME SENSOR ON POINT
CAM ROTATION ANGLE 52.8755°
FIG.7C TOP DEAD CENTER OF FIRST ROTATION CAM
CAM ROTATION ANGLE 100°
FIG.7D LOWERING POSITION OF FIRST TRANSFER ROLLER FOR MONOCHROME IMAGE
CAM ROTATION ANGLE 120°

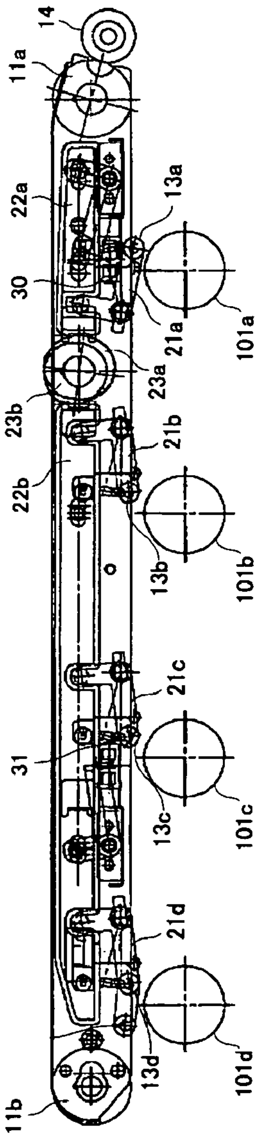
FIG.8E COLOR SENSOR ON POINT
CAM ROTATION ANGLE
072.8755°
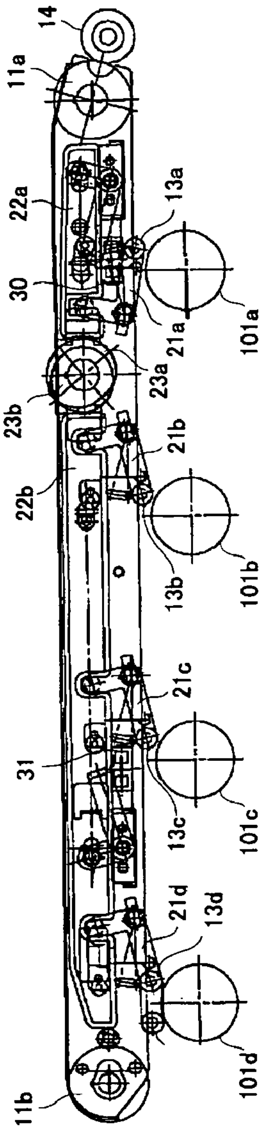
FIG.8F TOP DEAD CENTER OF SECOND
ROTATION CAM
CAM ROTATION ANGLE 220°
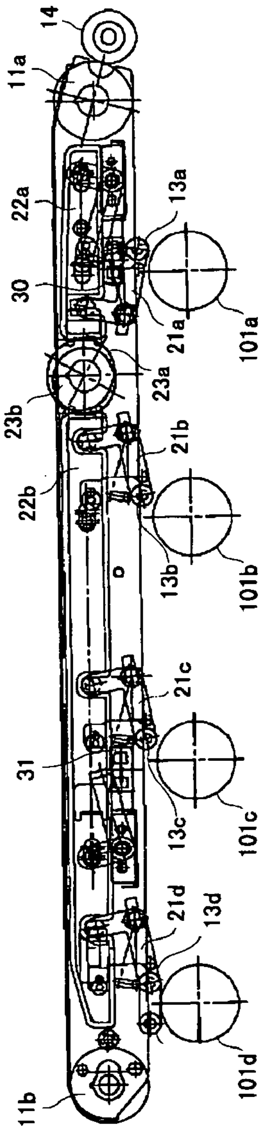
FIG.8G LOWERING POSITION OF FIRST
TRANSFER ROLLER FOR FULL
COLOR IMAGE
CAM ROTATION ANGLE 240°
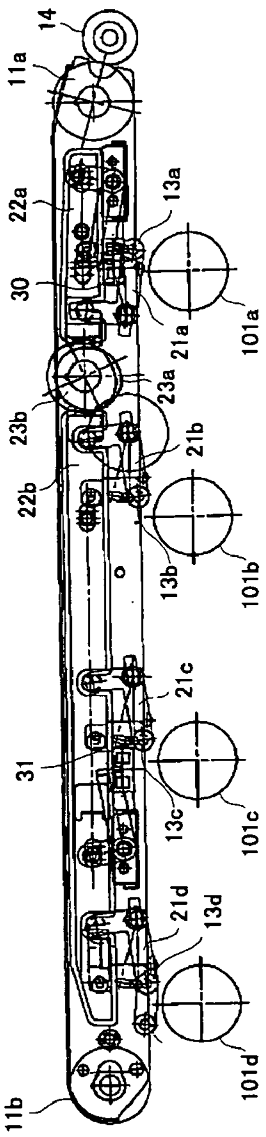
FIG.8H MONOCHROME SENSOR OFF
POINT
CAM ROTATION ANGLE
294.2863°

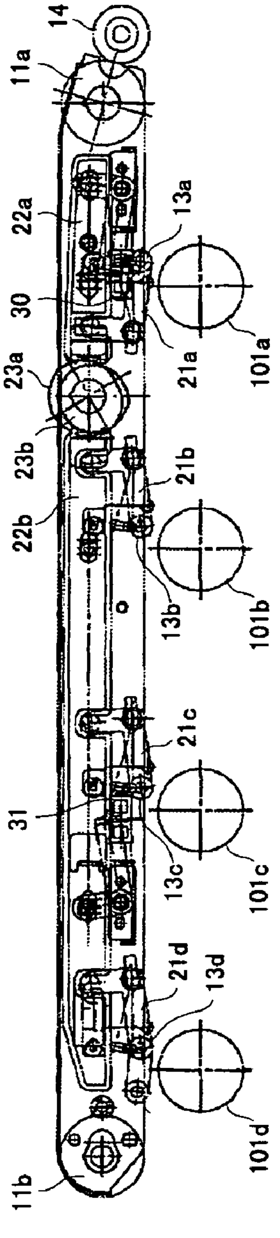
FIG.9I COLOR SENSOR OFF POINT
CAM ROTATION ANGLE
300.6704°
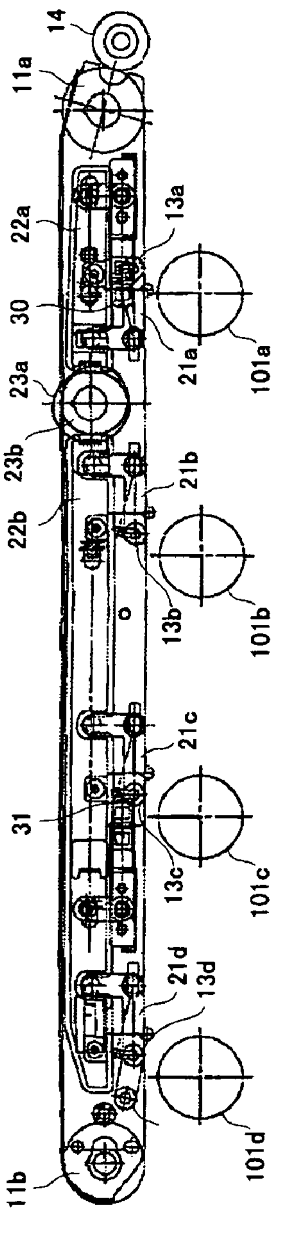
FIG.9J INITIAL STATE
CAM ROTATION ANGLE 0°

IMAGE FORMING APPARATUS

CROSS-REFERENCE TO RELATED APPLICATION

This application is related to Japanese Patent Application No. 2005-148122 filed on May 20, 2005, whose priority is claimed and the disclosure of which is incorporated by reference in its entirety.

BACKGROUND OF THE INVENTION

1. Field of the Invention

The present invention relates to an image forming apparatus.

2. Description of the Related Art

There is known a full-color image forming apparatus which forms color-separated images in black, yellow, cyan, and magenta on a plurality of photoconductors, respectively, and transfers each image on an intermediate transfer belt to be superposed. Among this kind of image forming apparatuses, there is an apparatus having two image forming functions, in other words, configurations of an image forming functional unit, one is for a monochrome page (a monochrome-only image forming function) and the other is for a color page (a color image forming function, a color mode). In the case of performing image formation of a monochrome page, the apparatus changes the image forming function from the color image forming function to the monochrome-only image forming function. For example, a position of the intermediate transfer belt is changed to put into contact only with a photoconductor for a black image so as to be transferable, but the intermediate transfer belt is not put into contact with the photoconductors for yellow, cyan, and magenta. By such a structure, abrasion of respective photoconductors for yellow, cyan, and magenta images can be suppressed. Further, the black image transferred on the intermediate transfer belt does not come into contact with the photoconductors for yellow, cyan, and magenta and therefore distortion of the black image can be prevented. In the case of forming color images, the position of the intermediate transfer belt is changed for color image forming and the intermediate transfer belt is put into contact with the respective photoconductors for black, yellow, cyan, and magenta so that the respective color images are transferred thereon.

However, in the aforementioned image forming apparatus, there is a case where a color page and a monochrome page are mixed during printing (printing job) in which a plurality of pages are included as one processing unit. In this case, if the image forming function is changed on a page by page basis, time for changing configuration is required. This lowers job efficiency. In view of reducing time loss due to position change of the intermediate transfer belt within one printing job, there is known a method which prints directly in a color mode even in the case of a monochrome page (for example, see Japanese Unexamined Patent Application Publication No. 2000-29266).

However, even if determination of the position change of the intermediate transfer belt is individually performed for each printing job, as in conventional way, efficient image forming is not necessarily realized, considering processing of a plurality of printing jobs. An example of such a case is where printing job as a copier (copy job) and printing job as a printer (print job) are alternatively processed.

SUMMARY OF THE INVENTION

The present invention is made in view of the foregoing situation, and the present invention is directed to preferable switching between a plurality of image forming functions in a plurality of printing jobs. Alternatively, the present invention aims to realize, in an image forming apparatus having a plurality of image data acquisition units for acquiring image data to be printed, preferable switching between a plurality of image forming functions with respect to printing jobs acquired from respective image data acquisition units.

According to the present invention, there is provided an image forming apparatus including: a plurality of image data acquisition units for respectively acquiring one or more page(s) of image data; a color or monochrome determining unit for determining whether each of the acquired pages is in color or in monochrome; an image forming unit for performing image formation of each page switchably using a monochrome-only image forming function for a monochrome page or a color and monochrome image forming function for a color page and a monochrome page; an image data switching unit for sequentially selecting and arranging the acquired pages of image data one by one so that the image formation of each page is performed in the order of selection; a function selecting unit for selecting either one of the monochrome-only and color and monochrome image forming functions for each of the arranged pages on the basis of the determination result made by the color or monochrome determining unit; and a control unit for controlling the image forming unit so that image formation of each page is performed using the selected image forming function.

The image forming apparatus of the present invention includes, as described above, the function selecting unit for selecting either one of the monochrome-only and color and monochrome image forming functions for each of the arranged pages on the basis of the determination result made by the color or monochrome determining unit; and a control unit for controlling the image forming unit so that image formation of each page is performed using the selected image forming function. Therefore, switching to a preferable image forming function can be realized for image formation of each page. For example, the image forming functions can be switched so as to further shorten time required for image formation. Alternatively, the image forming functions can be switched so as to further suppress consumption of a photoconductor.

The image data acquisition unit may be any that acquires image data for performing image formation and an embodiment thereof is not particularly limited. For example, it may be a printer I/F unit, as a printer, for acquiring printing data from a host, or it may be a network I/F unit for acquiring printing data from a terminal via a network. Instead, it may be a copier controller which, as a copier, acquires image data of a document from a scanner, or it may be a FAX modem which functions as a Fax and receives data to be printed.

Switching between the image forming functions may be, but not limited to, switching between mechanical configurations, for example, position change of an intermediate transfer belt. For example, the switching between the image forming functions may be switching between control parameters of each part of the image forming apparatus, for example, control temperatures of a fixing unit for melting toner. Instead, the switching may be switching between circuit configurations of an image processing unit which processes the acquired image data and circuit configurations such as memory allocations, or it may be switching between control parameters in an image forming process such as an electrophotographic process.

The function selecting unit may select, when the one or more pages of image data include two color pages and more than a predetermined number of monochrome page(s) therebetween, the monochrome-only image forming function to perform image formation of the monochrome page(s), and may select, when the one or more pages of image data contain two color pages and less than the predetermined number of monochrome page(s) therebetween, the color and monochrome image forming function to perform image formation of the monochrome page(s). Here, when a monochrome page is printed by the color and monochrome image forming function, it requires more time than printing by the monochrome-only image forming function if the time required for switching the image forming functions are zero. The number of monochrome page(s) may be predetermined, for example, comparing both the time required for the switching between the image forming functions and the time required for image formation of a monochrome page using the monochrome-only image forming function with the time required for image formation of a monochrome page using the color and monochrome image forming function. With this configuration, it is possible to switch between the image forming functions so as to further shorten time required for image formation by a simple processing of comparing the number of monochrome pages between the color pages with the predetermined number.

The image forming apparatus of the present invention may further include a cumulative number memory unit for storing cumulative numbers of monochrome pages and color pages subjected to image formation, respectively, wherein the function selecting unit may calculate a proportion of the cumulative number of the monochrome pages to the cumulative number of the color pages stored in the cumulative number memory unit, and when the proportion is more than a predetermined value, may select the monochrome-only image forming function to perform image formation of a monochrome page and when the proportion is less than the predetermined value, may select the color and monochrome image forming function to perform the image formation of the monochrome page. This can implement preferable switching between the image forming functions in view of the printing conditions.

The image forming apparatus of the present invention may further include a processing time memory unit for storing in advance time required for switching between the image forming functions, time required for image formation of a monochrome page using the monochrome-only image forming function and time required for image formation of a monochrome page using the color and monochrome image forming function, wherein the function selecting unit may select, when the one or more pages of image data include two color pages and one or more monochrome page(s) therebetween, either one of the image forming functions on the basis of the number of monochrome page(s) and the time required for the switching and the respective image formation stored in the processing time memory unit so that quicker image formation of the monochrome page(s) is performed. With this configuration, it is possible to change the image forming functions so as to perform image formation in a shorter time in view of the number of monochrome page(s), the time required for switching between the image forming functions, the time required for image formation of a monochrome page using the monochrome-only image forming function and the time required for image formation of a monochrome page using the color and monochrome image forming function.

The image forming apparatus of the present invention may further include a movement distance memory unit for storing in advance a traveling distance of a photoconductor during switching between the image forming functions, a traveling distance of the photoconductor during the image formation of a monochrome page using the monochrome-only image forming function and a traveling distance of the photoconductor during the image formation of a monochrome page using the color and monochrome image forming function, wherein the image forming unit may be of an electrophotographic type, and the function selecting unit may select, when the one or more pages of image data include two color pages and one or more monochrome page(s) therebetween, either one of the image forming functions on the basis of the number of the monochrome page(s) and the traveling distances stored in the movement distance memory unit so that image formation of the monochrome page(s) is performed with a shorter traveling distance of the photoconductor. With this configuration, it is possible to switch between the image forming functions so as to form images with reduced consumption of the photoconductor, in view of the number of the monochrome page(s), the traveling distance of the photoconductor during switching between the image forming functions, the traveling distance of the photoconductor during the image formation of a monochrome page using the monochrome-only image forming function and the traveling distance of the photoconductor during the image formation of a monochrome page using the color and monochrome image forming function.

The image forming apparatus of the present invention may include: the processing time memory unit for storing in advance time required for switching the image forming functions, the time required for image formation of a monochrome page using the monochrome-only image forming function and the time required for image formation of a monochrome page using the color and monochrome image forming function; and the movement distance memory unit for storing in advance a traveling distance of a photoconductor during switching between the image forming functions, the traveling distance of the photoconductor during the image formation of a monochrome page using the monochrome-only image forming function and the traveling distance of the photoconductor during the image formation of a monochrome page using the color and monochrome image forming function, wherein the image forming unit may be of an electrophotographic type, and the function selecting unit may include a selection condition switching unit for switching between a first selection mode and a second selection mode, when the one or more pages of image data include two color pages and one or more monochrome page(s) therebetween, the first selection mode selecting either one of the image forming functions on the basis of the number of monochrome page(s) and the time stored in the processing time memory unit so that quicker image formation of the monochrome page(s) is performed, and the second selection mode selecting either one of the image forming functions on the basis of the number of the monochrome page(s) and the traveling distances stored in the movement distance memory unit so that image formation of the monochrome page(s) is performed with a shorter traveling distance of the photoconductor. This allows for switching to a selection condition which is more suitable for printing conditions.

Further, the image forming apparatus of the present invention may further include a period control unit for determining whether or not the photoconductor is used for a predetermined period of time, wherein when the photoconductor is used for the predetermined period of time, the selection condition switching unit may switch from the first selection mode to the second selection mode. With this configuration, when the photoconductor is close to the end of its life, it is possible to secure a longer period of time until a service call is made, by switching to a mode of control having a less consumption of the photoconductor.

BRIEF DESCRIPTION OF THE DRAWINGS

FIGS. 7A to 7D are first explanation views showing switching states of a movement path of an intermediate transfer belt 11 shown in FIG. 6;

FIGS. 8E to 8H are second explanation views showing switching states of the movement path of the intermediate transfer belt 11 shown in FIG. 6; and FIGS. 9I to 9J are third explanation views showing switching states of the movement path of the intermediate transfer belt 11 shown in FIG. 6.

DESCRIPTION OF THE PREFERRED EMBODIMENTS

The present invention will be described in detail below with reference to the drawings. With the following description, the present invention will be more clearly understood. In addition, the present invention is not limited to the following description.

(Mechanical Configuration of Image Forming Apparatus)

First, an example of mechanical configuration of an image forming apparatus according to the present invention will be described.

Figure 6:
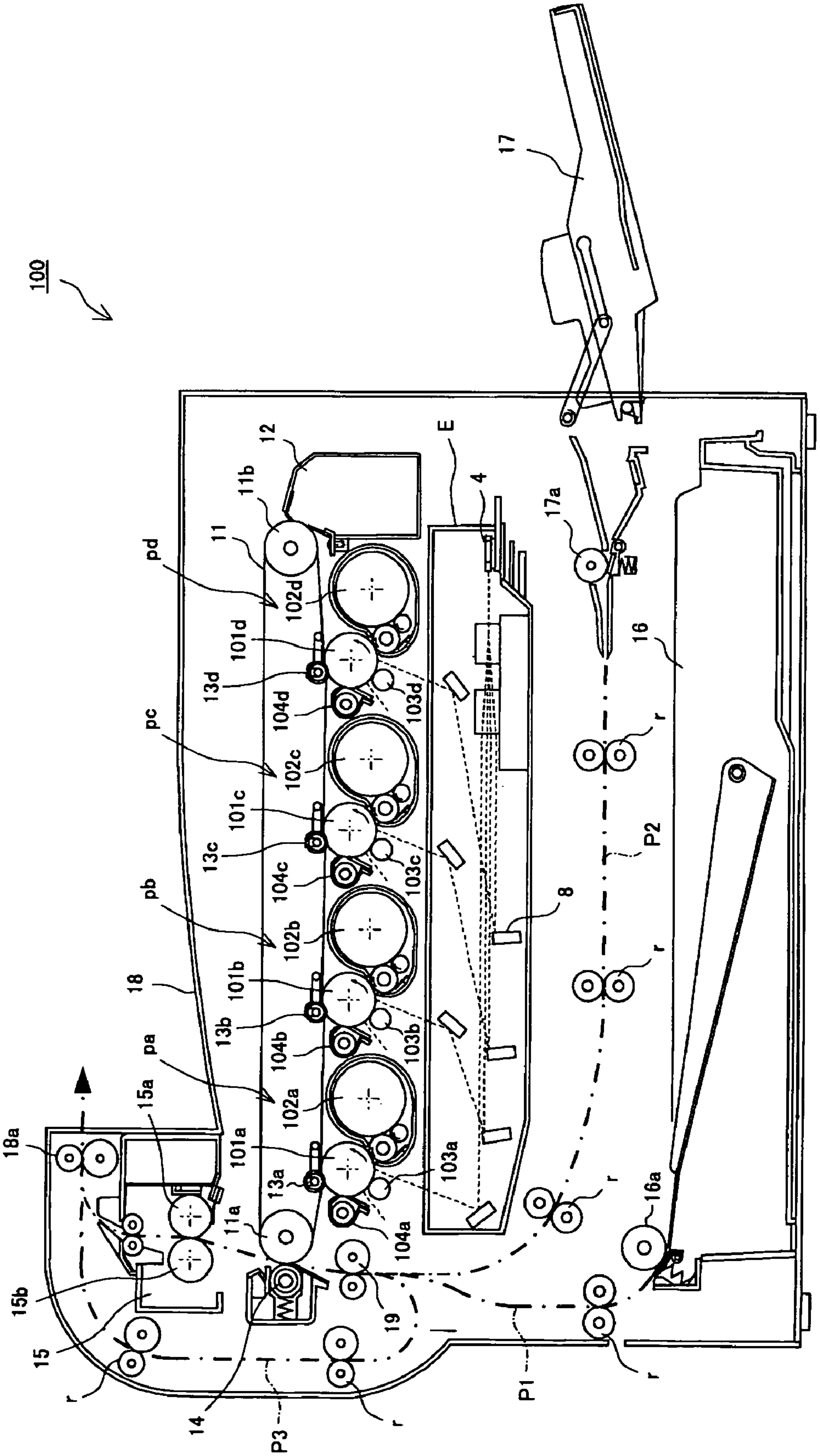
FIG. 6 is a view showing configuration of an image forming apparatus provided with a intermediate transfer belt according to an embodiment of the present invention.

FIG. 6 is a view showing configuration of an image forming apparatus equipped with a intermediate transfer belt according to an embodiment of the present invention. An image forming apparatus 100 forms multicolor or unicolor images to recording medium such as a sheet according to image data received from outside. Consequently, the image forming apparatus 100 includes an exposure unit E, a photoconductor drum 101 (101*a* to 101*d*), developer unit 102 (102*a* to 102*d*), a charging roller 103 (103*a* to 103*d*), a cleaning unit 104 (104*a* to 104*d*), an intermediate transfer belt 11, a first transfer roller 13 (13*a* to 13*d*), a second transfer roller 14, a fuser unit 15, sheet conveying paths P1, P2, and P3, a paper feeding cassette 16, a manual paper feeding tray 17, a paper exit tray 18, and the like. In this specification, when there is an individual object for each hue, reference marks to those objects are allocated as follows. A number shared in common with hue is given to each object and letter "a" to "d" for discriminating each hue is given at the end of the number. The letters given at the end correspond as follows: "a" denotes black, "b" denotes cyan, "c" denotes magenta, and "d" denotes yellow. In the case of "a" to "d" omitted at the end, this means that the same description is applied to each of the hues.

In addition, the intermediate transfer belt 11 and the first transfer roller 13 are included in the intermediate transfer belt according to the present invention.

The image forming apparatus 100 performs image forming using image data corresponding to each hue of four colors in which black (K) is added to yellow (Y), magenta (M), and cyan (Y). Respective hues of yellow, magenta, and cyan are the three subtractive color primaries. The photoconductor drum 101 (101*a* to 101*d*), the developer unit 102 (102*a* to 102*d*), the charging roller 103 (103*a* to 103*d*), the first transfer roller 13 (13*a* to 13*d*), and the cleaning unit 104 (104*a* to 104*d*) are each provided four according to each hue and constitute the image forming unit with respect to each hue. The image forming unit of each hue is disposed along a moving direction (secondary scanning direction) of the intermediate transfer belt 11.

The charging roller 103 is a kind of a contacting type charger which uniformly charges the surface of the photoconductor drum 101 to be a predetermined electro-static potential. In place of the charging roller 103, a contacting type charger using a charging brush or a non-contacting type charger using an electrifying charger can be used. The exposure unit E includes a semiconductor laser element not shown in the drawing, a polygon mirror 4, reflecting mirrors 8, and the like. The semiconductor laser element emits four laser beams respectively modulated by printing image data of respective hues of black, cyan, magenta, and yellow. The respectively emitted laser beams are irradiated to the surface of the photoconductor drums 101*a* to 101*d*, respectively. Electrostatic latent images for respective hues of black, cyan, magenta, and yellow are formed on the surface of the photoconductor drum 101*a* to 101*d* by the irradiated laser beams.

The developer unit 102 supplies a developer on the surface of the photoconductor drum 101*a* to reveal the electrostatic latent image to a toner image. The developer of each hue of black, cyan, magenta, and yellow is accommodated in the developer units 102*a* to 102*d*, respectively. Latent images for respective hues formed on the photoconductor drums 101*a* to 101*d* are revealed to toner images of the respective hues of black, cyan, magenta, and yellow. The respective revealed toner images are transferred onto the intermediate transfer belt 11. The cleaning unit 104 removes and recovers toner remained on the surface of the photoconductor drum 101 after development and transfer.

The intermediate transfer belt 11 disposed above the photoconductor drum 101 is looped around between a driving roller 11*a* and a following roller 11*b* to be driven in the clockwise direction. On the outer circumference of the intermediate transfer belt 11, the photoconductor drum 101*d*, photoconductor drum 101*c*, photoconductor drum 101*b*, and photoconductor drum 101*a* are disposed in this order along the driving direction. The first transfer rollers 13*a* to 13*d* are disposed at positions opposite the respective photoconductor drums 101*a* to 101*d*, across the intermediate transfer belt 11. The respective positions where the photoconductor drums 101*a* to 101*d* come in contact with the intermediate transfer belt 11 are the first transfer positions of the respective hues.

The intermediate transfer belt 11 is endlessly formed using a film with a thickness of approximately 100 μm to 150 μm. A resistance value of the film is on the order of $10^{11}$ to $10^{12}$ Ω·cm. The reason is that if the resistance value of the intermediate transfer belt 11 is lower than this level, leakage from the intermediate transfer belt 11 is generated and consequently sufficient transferring electric power cannot be maintained during a first transfer; and, if the resistance value is higher than this level, means for charge-eliminating the intermediate transfer belt 11 after passing the respective transfer positions is required.

A first transfer bias (corresponding to the transferring electric power of the present invention) which is a reverse polarity to charging polarity of toner is applied to the first transfer rollers 13*a* to 13*d* by a constant-voltage power source not shown in the drawing. The reason is that toner images carried on the surface of the photoconductor drums 101*a* to 101*d* are transferred on the intermediate transfer belt 11. By this means the toner images of the respective hues formed on the photoconductor drums 101 (101*a* to 101*d*) are transferred on the outer circumference of the intermediate transfer belt 11 one on top of the other.

However, of image data of the respective hues of yellow, magenta, cyan, and black, when only a part of the image data is inputted, image forming is performed on only photoconductor drum corresponding to the inputted hue. For example, in forming monochrome image forming, image forming is performed on only photoconductor drum 101*a* corresponding to the black hue. Therefore, only black toner image is transferred to the intermediate transfer belt 11.

In addition, in this embodiment of the present invention, the first transfer bias is constantly applied to all first transfer rollers 13*a* to 13*d* even when monochrome image forming or full color image forming is performed. Furthermore, all the first transfer rollers 13*a* to 13*d* come into contact with the intermediate transfer belt 11; because if all the first transfer rollers 13*a* to 13*d* do not come into contact with the intermediate transfer belt 11, the amount of the first transfer bias applied to the intermediate transfer belt 11 changes for each image forming and consequently transferring accuracy varies.

Each of the first transfer rollers 13*a* to 13*d* is configured so that the surface of an axis in which metal (for example, stainless steel) with a diameter of 8 to 10 mm is a material is coated with a conductive elastic material (for example, Ethylene Propylene Diene Monomer (referred to as EPDM), urethane foam). Then, the conductive elastic material comes into contact with the intermediate transfer belt 11 and therefore high voltage can be uniformly applied to the intermediate transfer belt 11. In addition, in place of each of the first transfer rollers 13*a* to 13*d*, a brush shaped intermediate transfer member can be used.

In addition, each of the first transfer rollers 13*a* to 13*d* is biased by a spring in a direction different from a normal direction of the photoconductor drums 101*a* to 101*d*.

The toner image transferred on the outer circumference of the intermediate transfer belt 11 at each of the first transfer positions is conveyed to a second transfer position at which the intermediate transfer belt 11 opposes the second transfer roller 14 with the rotation of the intermediate transfer belt 11. The intermediate transfer belt 11 is press-contacted between the second transfer roller 14 and the driving roller 11*a* at the second transfer position and has a predetermined nip pressure with the second transfer roller 14.

Printing sheets are fed from the paper feeding cassette 16 or the manual paper feeding tray 17. When the fed sheet passes between the second transfer roller 14 and the intermediate transfer belt 11, high voltage of a reversed polarity to a toner charging polarity is applied to the second transfer roller 14. By this means the toner image is transferred from the intermediate transfer belt 11 to the sheet surface.

In addition, in order that the nip pressure between the second transfer roller 14 and the intermediate transfer belt 11 is set to a predetermined pressure, either one of the second transfer roller 14 or the driving roller 11*a* is made up of a hard material (metal or the like); and the other remaining is made up of a soft material such as elastic roller (elastic rubber roller, expandable resin roller, or the like).

Furthermore, a part of the toner first transferred from the photoconductor drum 101 to the intermediate transfer belt 11 is not transferred to the sheet, but remained on the intermediate transfer belt 11. The remained toner is recovered by the cleaning unit 12 to prevent it from mixing at the next process.

The sheet transferred at the second transfer is introduced to the fuser unit 15. The fuser unit 15 includes a heat roller 15*a* and a pressure roller 15*b* being composedly disposed. The sheet passes through the both rollers are subject to heating and pressing. By this means the toner image transferred on the sheet is robustly fixed to the sheet surface. The sheet passed through the fuser unit 15 is delivered above the paper exit tray 18 by a paper exit roller 18*a*.

The image forming apparatus 100 includes a substantially vertical sheet conveying path P1. The sheet conveying path P1 is a conveyance path for feeding sheets accommodated in the paper feeding cassette 16 to the second transfer roller 14. A pickup roller 16*a*, conveying roller and registration roller 19 are disposed in the sheet conveying path P1 along a conveyance direction thereof. The pickup roller 16*a* feeds out the sheet in the paper feeding cassette 16 one by one to within the sheet conveying path P1. The conveying roller conveys the conveyed sheets toward downstream of the conveyance path. The registration roller 19 leads the fed out sheet between the second transfer roller 14 and the intermediate transfer belt 11 at a predetermined timing.

Furthermore, a sheet conveying path P2 is formed between the manual paper feeding tray 17 and the registration roller 19 inside the image forming apparatus 100. A pickup roller 17*a* and a conveying roller r are disposed in the sheet conveying path P2 along the conveyance path.

Furthermore, a sheet conveying path P3 is formed downstream of the sheet conveying path P1. A paper exit roller 18*a* is disposed at an end portion of the sheet conveying path P3. The paper exit roller 18*a* conveys the sheet to deliver it to the paper exit tray 18.

A conveyance direction of the paper exit roller 18*a* is switchable between forward and reverse directions. In simplex printing in which printing is done on one sheet surface, only the forward direction which conveys the sheet to the paper exit tray 18 is driven. The sheet in which image forming on a first surface is completed is delivered to the paper exit tray 18 passing through the paper exit roller 18*a*. Meanwhile, when a first surface is printed in duplex printing, the discharging roller 18*a* is driven in the forward rotation direction until the end portion of the sheet passes through the fuser unit 15. After that, the discharging roller 18*a* is driven in the reverse rotation direction with the end portion of the sheet being held in sandwiched relation, so that the sheet is lead to within the sheet conveying path P3. The sheet lead to the sheet conveying path P3 reach the registration roller 19 disposed at the end of the sheet conveying path P3. At this time, obverse and reverse of the sheet differs from in printing the first surface.

The registration roller 19 leads the sheet ed via the sheet conveying path P3 between the second transfer roller 14 and the intermediate transfer belt 11 in synchronization with the toner image on the intermediate transfer belt 11. Consequently, the registration roller 19 stops conveying at a time when the leading edge of the fed or conveyed sheet reaches the registration roller 19. The sheet conveyed to the position of the registration roller 19 once stops its movement with the leading edge being put into contact with the registration roller 19. After that, the registration roller 19 starts to rotate at a timing in which the toner image formed on the intermediate transfer belt 11 synchronizes with the sheet.

Next, switching of image forming function of the image forming apparatus 100 will be described. The image forming apparatus shown in FIG. 6 can switching the image forming function between the image forming of the monochrome page and the image forming of the color page. Specifically, intermediate transfer belt 11 and the first transfer roller 13 are made to be disjunct from the photoconductor drum 101. The switching of the image forming function is realized by rotating a rotation cam not shown in FIG. 6.

FIG. 7A to FIG. 9J are explanation views showing configuration of the intermediate transfer belt for supporting the intermediate transfer belt 11. The intermediate transfer belt includes rotation cams 23*a* and 23*b*. A control unit 29 to be described later (refer to FIG. 1 to FIG. 3) makes the rotation cams 23*a* and 23*b* go into a 360-degree roll for disjunction. When the rotation cam 23*b* rotates, the first transfer roller 13*a* moves downwards and upwards via linking members 22*a* and 21*a*. The intermediate transfer belt 11 is disjunct from the photoconductor drum 101*a* with the first transfer roller 13*a* moving upwards and downwards. Furthermore, when the rotation cam 23*a* rotates, first transfer rollers 13*b*, 13*c*, and 13*d* move downwards and upwards via linking members 22*b*, 21*b*, 21*c*, and 21*d*. The intermediate transfer belt 11 is disjunct from the photoconductor drums 101*b*, 101*c*, and 101*d* with the first transfer rollers 13*b*, 13*c*, and 13*d* moving upwards and downwards. In addition, FIG. 7A to FIG. 9J are views seen from the rear surface side of the intermediate transfer belt shown in FIG. 6.

FIG. 7A shows a state where the respective first transfer rollers 13*a* to 13*d* are apart from the photoconductor drums 101*a* to 101*d*. FIG. 7A is a waiting state when the first transfer is not performed (initial state). When the rotation cams 23*a* and 23*b* rotate from this state, a monochrome sensor 30 is ON at a cam rotation angle of 52.8755 degrees of the rotation cam, as shown in FIG. 7B. At the same time, it becomes a state where the first transfer roller 13*a* for monochrome image comes close to the photoconductor drum 101*a* for monochrome image by a predetermined distance. The monochrome sensor 30 detects that the first transfer roller 13*a* comes the closest to the photoconductor drum 101*a*. Further, the first transfer roller 13*a* comes the closest to the photoconductor drum 101*a* at a cam rotation angle of 100 degrees, as shown in FIG. 7C.

Next, at a cam rotation angle of 120 degrees shown in FIG. 7D, the first transfer roller 13*a* moves further upwards than the state shown in FIG. 7C. This position is the most suitable position to perform the first transfer of the black toner image formed on the photoconductor drum 101*a*.

Furthermore, at a cam rotation angle of 172.8755 degrees shown in FIG. 8E, a color sensor 31 is ON. At the same time, it becomes a state where the respective first transfer rollers 13*b* to 13*d* of yellow, magenta, and cyan come close to the corresponding photoconductor drums 101*b* to 101*d*. The color sensor 31 detects that the first transfer rollers 13*b* to 13*d* come close to the photoconductor drums 101*b* to 101*d*. At this time, the first transfer roller 13*a* for black maintains a position suitable for the first transfer. Further, at a cam rotation angle of 220 degrees shown in FIG. 8F, the first transfer rollers 13*b* to 13*d* come the closest to the photoconductor drums 101*b* to 101*d*.

Next, at a cam rotation angle of 240 degrees shown in FIG. 8G, the first transfer rollers 13*b* to 13*d* move further upwards than the position shown in FIG. 8F. This position is the most suitable position to perform the first transfer of the toner images of the respective hues formed on the respective photoconductor drums 101*b* to 101*d*. At this time, the first transfer roller 13*a* for black maintains a position suitable for the first transfer.

After that, at a cam rotation angle of 294.2863 degrees shown in FIG. 8H, the monochrome sensor 30 is OFF; and at a cam rotation angle of 300.6704 degrees shown in FIG. 9I, the color sensor 31 is OFF. Furthermore, the first transfer rollers 13*a* to 13*d* move upwards from a position which is the most suitable for the first transfer. Finally, at a cam rotation angle of 360 degrees shown in FIG. 9J, the first transfer rollers 13*a* to 13*d* return to the waiting position (initial state) shown in FIG. 7A.

As described above, the control unit not shown in the drawing makes the rotation cams 23*a* and 23*b* rotate to switch the first transfer rollers 13*a* to 13*d* to the positions corresponding to the monochrome image printing, full color image printing, and the initial state.

(Functional Configuration of Image Forming Apparatus)

Figure 1:
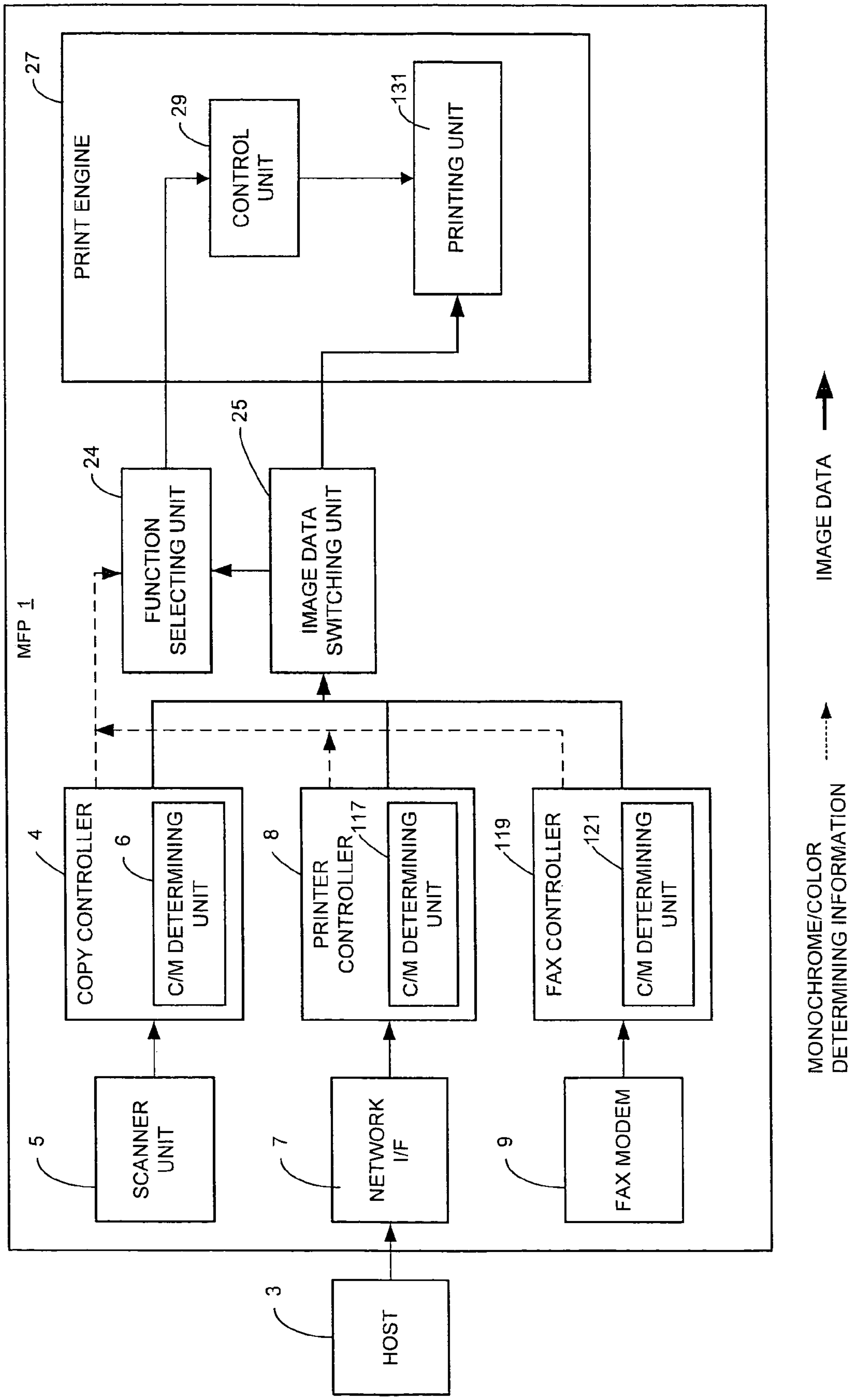
FIG. 1 is a block diagram showing an example of functional configuration of an image forming apparatus according to the present invention.

FIG. 1 is a block diagram showing an example of functional configuration of an image forming apparatus according to the present invention. As shown in FIG. 1, a digital complex machine (multi function products, referred to as MFP 1) as the image forming apparatus includes three image data acquisition units: the first is a scanner unit 5 used when an MFP 1 functions as a copier; the second is a network I/F 7 for acquiring printing data from a host 3 via a network when the MFP 1 functions as a printer, the host 3 being a personal computer, for example; and the third is a FAX modem 9 for receiving images from transmission side FAXes via public line.

The scanner unit 5 includes mechanistic components and circuit parts for operating the mechanism. The scanner unit 5 is controlled by a copy controller 4. The copy controller 4 is composed of, for example, a microcomputer, a read only memory (referred to as ROM) for storing programs showing processing procedures in which microcomputers execute, a memory element for holding back up data, and an input/output circuit. The copy controller 4 includes a color or monochrome determining unit (C/M determining unit) 6 which determines whether or not the relevant page is monochrome or color on image data of each original page read by the scanner unit 5. Furthermore, the network I/F 7 are controlled by a printer controller 8. The printer controller 8 is composed of, for example, a microcomputer, an ROM for storing programs showing processing procedures in which microcomputers execute, a memory element for holding back up data, and an input/output circuit. Furthermore, the copy controller 4 and a FAX controller 119 may be physically shared with a microcomputer. In this case, programs for actualizing function of each image data acquisition unit is executed by a common microcomputer. The printer controller 8 includes a C/M determining unit 117 which determines whether or not each page of printing data acquired from the host 3 is monochrome or color. Further, the FAX modem 9 is controlled by the FAX controller 119. The FAX controller 119 includes a C/M determining unit 121 which determines whether or not each page of images received from transmitting side FAXes is monochrome or color.

Image data acquired by any of the aforementioned three image acquisition units is inputted to a printing unit 131 of a print engine 27 via an image data switching unit 25. The printing unit 131 serving as an image forming unit forms images of each page from the inputted image data. Even when there is image data from a plurality of image data acquisition units, the printing unit 131 cannot form image of the plurality of image data at the same time. Consequently, the image data switching unit 25 selects any one of the image data to supply it to the printing unit 131. If the printing unit 131 completes image forming of the selected image data, the image data switching unit 25 selects next image data. By repeating this procedure, the printing unit 131 sequentially process image data to form images.

As described above, the image data switching unit 25 arranges image data from the plurality of image data acquisition units in processing order to generate substantial processing queue on each page forming images. The printing unit 131 performs sequential processing on each page of the image data in the processing queue to form images. The term "substantial queue" here denotes that each page of the image data is sequentially processed according to determined order. In other words, the image data may not need to have data structure of explicit queue.

Here, the image data switching unit 25 and a function selecting unit 24 may be those in which a microcomputer executes processing program corresponding to such function to implement such function. The microcomputer for executing the relevant program, for example, may be shared with a microcomputer which realizes function of the copy controller 4. Furthermore, the printing unit 131 in this embodiment is an electrophotographic image forming apparatus which includes mechanistic components and circuit parts for operating the mechanism.

The print engine 27 according to the present invention includes the image forming function for exclusive monochrome (the monochrome-only image forming function), which forms images of a monochrome page; and the image forming function for both color and monochrome (the color and monochrome image forming function), which forms images of a color page or a monochrome page. More specifically, the intermediate transfer belt is not put into contact with the photoconductors for yellow, cyan, and magenta in image forming of the monochrome page, but is put into contact with only the transfer portion of the photoconductor for black. Furthermore, in outputting of the color page, the intermediate transfer belt is put into contact with respective photoconductors for black, yellow, cyan, and magenta. In this way, positions of the intermediate transfer belt are moved according to image forming. Predetermined time is required for switching positions of the intermediate transfer belt. In order to save time required for switching, it is possible to perform image forming of the monochrome page at a position where the color page is outputted.

Here, the control unit 29 of the print engine may be composed of, for example, a microcomputer, an ROM for storing programs showing processing procedures in which a microcomputer executes, a memory element for holding back up data, and an input/output circuit. In this embodiment, the control unit 29 is a microcomputer different from the copy controller 4. In this regards, however, both may be configured by a common microcomputer in different embodiments.

The image data switching unit 25 informs the function selecting unit 24 of processing order of the image data. Furthermore, the function selecting unit 24 acquires determination result on each page of the image data from the C/M determining units 6, 117, and 121. On the basis of these results, the function selecting unit 24 selects that image forming of each page is performed by which of the image forming functions. According to the selected result, the control unit 29 switches the image forming function of the printing unit 131 to control operation of the image forming. The above-mention is description of each block shown in FIG. 1.

Figure 2:
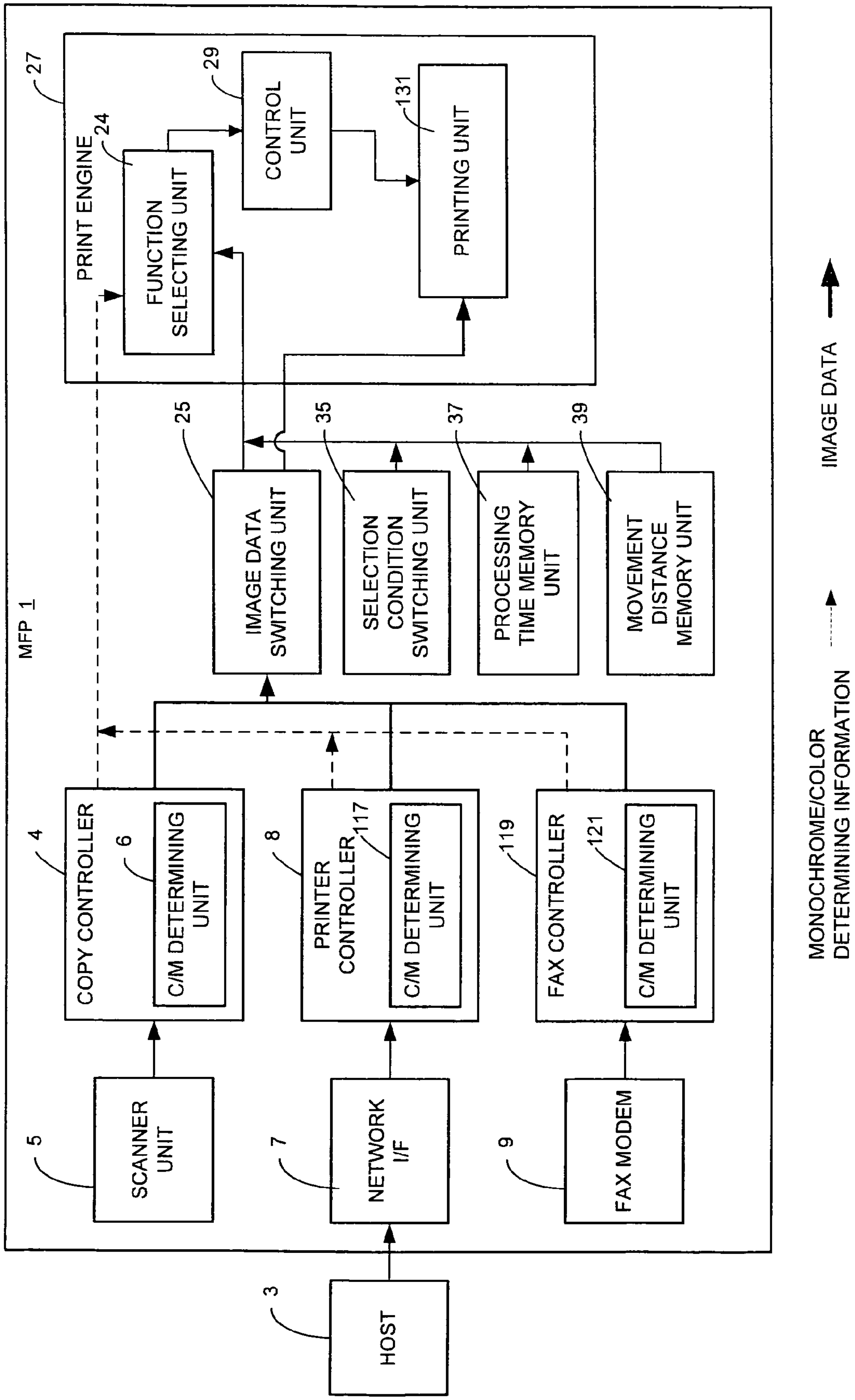
FIG. 2 is a block diagram showing an example of functional configuration of an image forming apparatus different from FIG. 1.

FIG. 2 is a block diagram showing an example of functional configuration of an image forming apparatus different from FIG. 1. First, different point of an MFP 1 shown in FIG. 2 is that a function selecting unit 24 is included in a print engine 27. That is, a program for implementing function of the function selecting unit 24 is executed by a microcomputer shared with a control unit 29. Then, it is different from a microcomputer for implementing function of a copy controller 4. Selection processing of the function selecting unit 24 relates closely to a structure of a printing unit 131. Therefore, if the function selecting unit 24 and the printing unit 131 are disposed in the print engine 27, a part depending on the configuration of the image forming apparatus can be put together by the print engine 27. That is, this can be module of processing program depending on the image forming apparatus. But, the microcomputer of the print engine 27 has to be provided with commensurate throughput. As for arrangement of the function selecting unit 24, designers may determine in view of such conditions.

Next different point is that the MFP 1 includes a processing time memory unit 37, a movement distance memory unit 39, and a selection condition switching unit 35. The processing time memory unit 37 is a block which stores time required for changing the image forming function and image forming speed of color pages and monochrome pages. The movement distance memory unit 39 is a block which stores a photoconductor movement distance when the image forming function is switched and a photoconductor movement distance when image forming of each page is performed. The selection condition switching unit 35 is a block which switches whether the function selecting unit 24 selects the image forming function on the basis of the contents stored in the processing time memory unit 37 or selects the image forming function on the basis of the contents stored in the movement distance memory unit 39. More specifically, the processing time memory unit 37 previously stores time $T_{k->c}$ required for switching from the image forming function for exclusive monochrome to the image forming function for both color and monochrome, time $T_{c->k}$ required for switching from the image forming function for both color and monochrome to the image forming function for exclusive monochrome, time Tk required for printing per one page by the image forming function for exclusive monochrome, and time Tc required for printing per one page by the image forming function for both color and monochrome. Furthermore, the movement distance memory unit 39 previously stores movement distance $D_{k->c}$ required for switching from the image forming function for exclusive monochrome to the image forming function for both color and monochrome, movement distance $D_{c->k}$ required for switching from the image forming function for both color and monochrome to the image forming function for exclusive monochrome, movement distance Dk required for printing per one page by the image forming function for exclusive monochrome, and movement distance Dc required for printing per one page by the image forming function for both color and monochrome.

Figure 3:
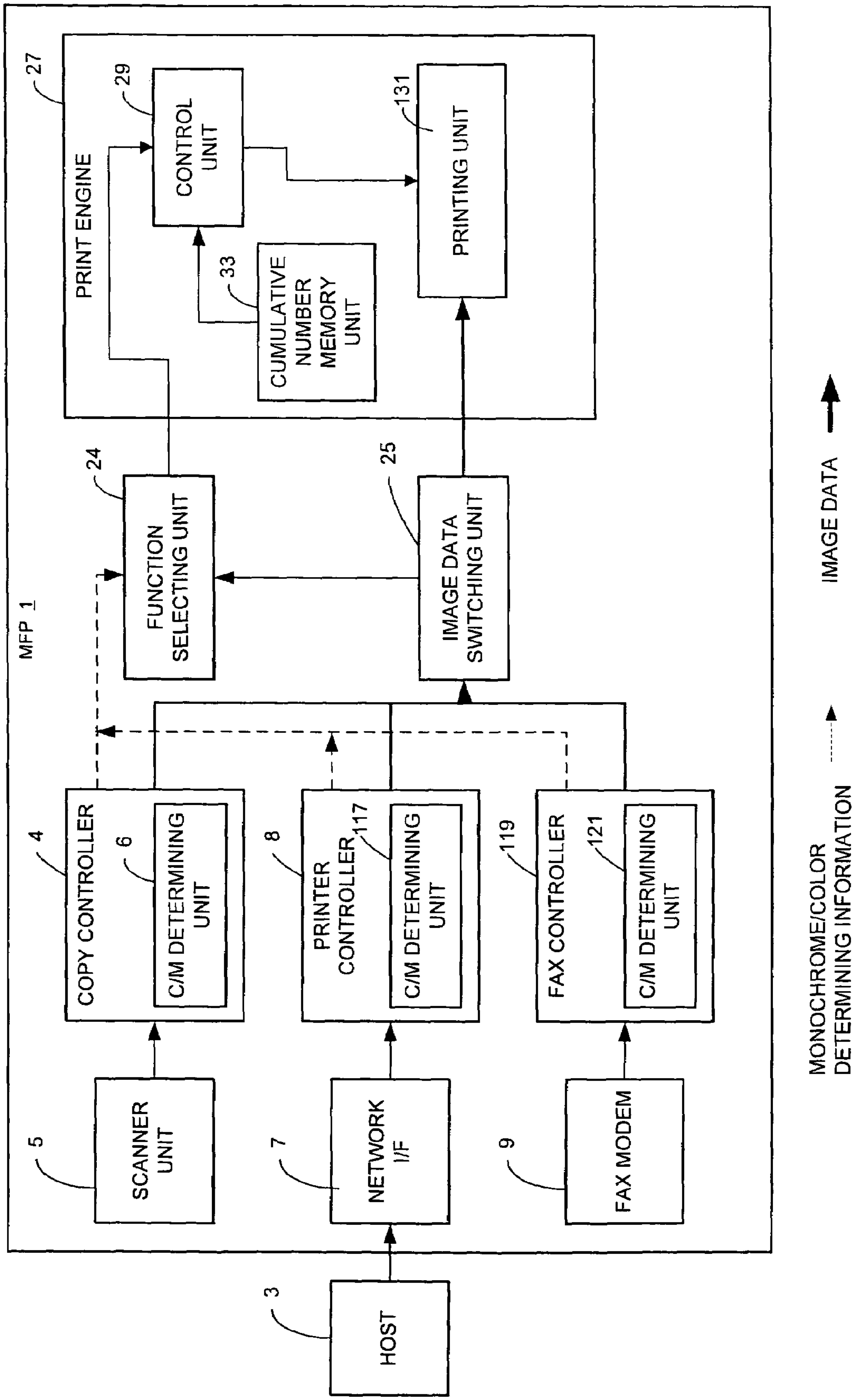
FIG. 3 is a block diagram showing an example of functional configuration of an image forming apparatus further different from FIG. 1.

Furthermore, FIG. 3 is a block diagram showing an example of functional configuration of an image forming apparatus further different from FIG. 1. An MFP 1 shown in FIG. 3 is different in configuration from that of FIG. 1 in that a print engine 27 includes a cumulative number memory unit 33 which stores cumulative number of pages Sk of monochrome pages and cumulative number of pages Sc of color pages of image data acquired in the past.

Processing procedure for determining (selecting) image forming function of a printing unit 131 with respect to respective pages on the basis of the aforementioned configuration will be described below.

First Embodiment

Processing procedure, in which a function selecting unit 24 selects the image forming function of a printing unit 131 with respect to respective pages, in this embodiment, will be described. The function selecting unit 24 selects the image forming function of the printing unit 131 with respect to respective pages on the basis of printing order of respective pages determined by an image data switching unit 25 and determined result of a C/M determining unit.

Figure 4:
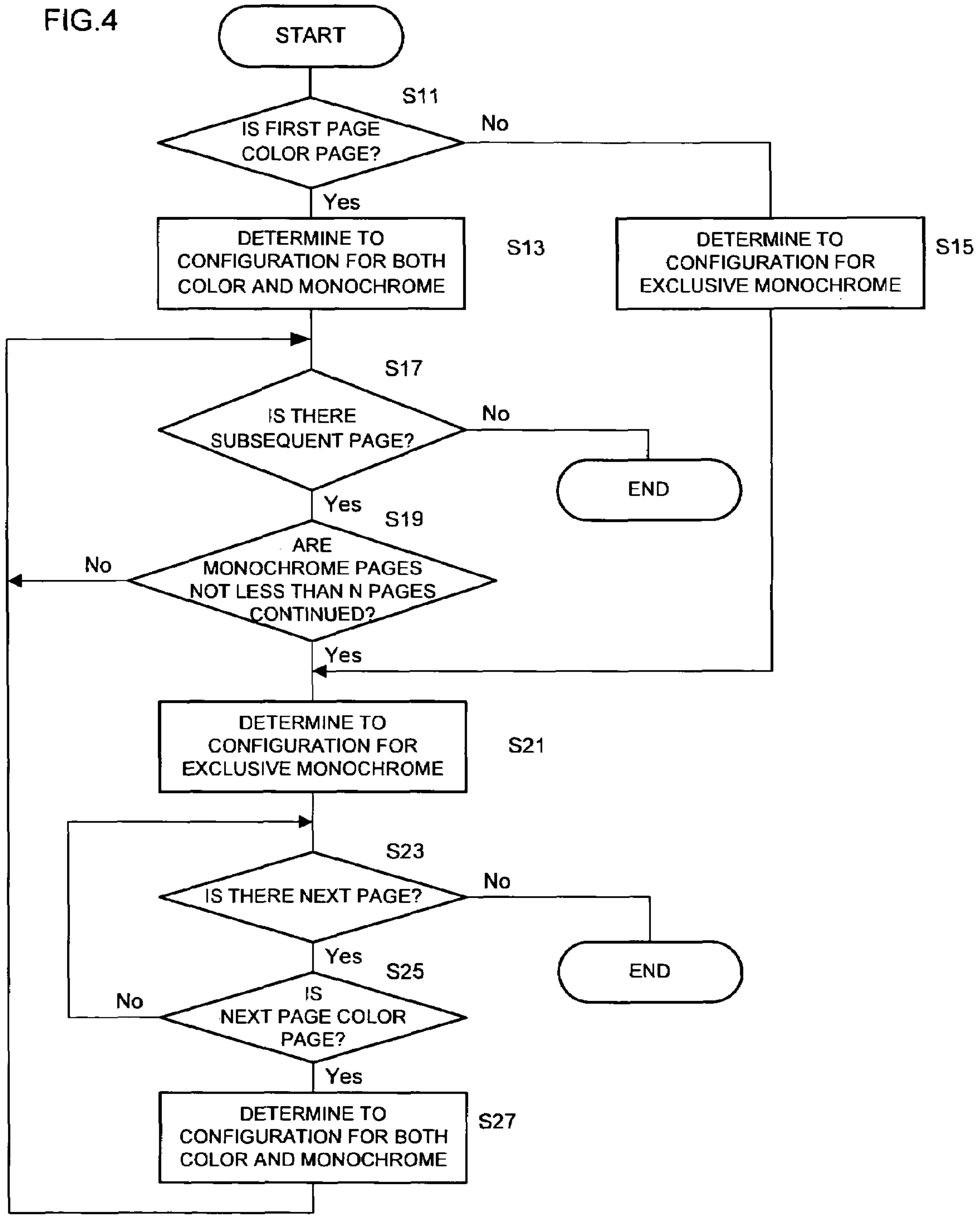
FIG. 4 is a flow chart showing an example of processing in which a function selecting unit 24 of the image forming apparatus shown in FIG. 1 and FIG. 2 selects image forming function which performs image forming of respective pages.

FIG. 4 is a flow chart showing an example of processing in which the function selecting unit 24 selects the image forming function of the printing unit 131 with respect to respective pages, in the image forming apparatuses shown in FIG. 1 and FIG. 2. As shown in FIG. 4, the function selecting unit 24 knows image data to be processed first is acquired by which image data acquisition unit, in accordance with processing order determined by the image data switching unit 25. For example, image data from the network I/F 7 is the image data to be processed first. In this case, the function selecting unit 24 acquires determination result of the C/M determining unit 117 included in the printer controller 8 to know whether the first page of the image data is monochrome or color (step S11).

When determination result of the aforementioned step S11 is a monochrome page, the function selecting unit 24 determines that image forming of the first page is performed by the image forming function for exclusive monochrome (step S15), and directs the control unit 29 of the print engine 27 to switch to the image forming function for exclusive monochrome. After that, routine proceeds to step S23. The control unit 29 switches the printing unit 131 to the image forming function for exclusive monochrome according to the aforementioned direction to perform image forming of an object page.

On the other hand, when the first page is a color page by the determination of the step S11, the function selecting unit 24 temporarily selects to perform image forming of the first page by the image forming function for both color and monochrome (step S13). In this regard, however, determination of the step S13 is changeable according to conditions of the subsequent page. That is, in the next step, the function selecting unit 24 determines whether or not there is a further subsequent page (step S17). When there is not a subsequent page, the contents of the temporary determination is set as a final determination and direction is made to the control unit 29 of the print engine 27 so as to switch to be finally determined image forming function to complete processing. The control unit 29 switches the printing unit 131 to the finally determined image forming function according to the aforementioned direction to perform image forming of an object page.

On the other hand, when it is determined by the determination of the step S17 that there is a subsequent page, the function selecting unit 24 determines whether or not monochrome pages of not less than predetermined N pages including the subsequent page continue (step S19). The term "subsequent page" here denotes a subsequent page in the substantial queue generated by the image data switching unit 25. For example, If there are two printing jobs A and B in the queue, it is determined that a head page of the printing job B follows a final page of the printing job A. Furthermore, for example, when printing job C with high priority cuts in a second page or later of printing job D during processing at present, it is determined that a head page of the printing job C follows the second page of the printing job D. Furthermore, it is determined that a subsequent page of the final page of the printing job A is a third page of the printing job B. That is, a subsequent page is determined by the order in which the printing unit 131 performs image forming. As for a subsequent page to be object, the following description is the same.

As a result of determination of the step S19, when monochrome pages of not less than N pages are not continued, the function selecting unit 24 sets the contents of the temporary determination as the final determination, and directs the control unit 29 to switch to the image forming function for both color and monochrome. Then, routine returns to step S17 to repeat determination of the next page. Furthermore, the control unit 29 switches the image forming function of the printing unit 131 to the image forming function for both color and monochrome, according to the aforementioned direction. For example, in the case of N=3, when three pages of monochrome page continue, image forming of the monochrome page is performed by the image forming function for exclusive monochrome. When the monochrome page is one page, image forming of the relevant monochrome page is performed by the image forming function for both color and monochrome. Switching of the image forming function before and after the relevant monochrome page is not performed.

On the other hand, when monochrome pages of not less than N pages continue by the determination of the step S19, the function selecting unit 24 selects that the image forming function for both color and monochrome temporarily determined is changed to perform image forming of the relevant page by the image forming function for exclusive monochrome (step S21). Then, direction is made to the control unit 29 of the print engine 27 so as to switch to the image forming function for exclusive monochrome. The control unit 29 performs image forming of 1 page being an object in a state where the image forming function of the printing unit 131 is switched to the image forming function for exclusive monochrome, according to the aforementioned direction.

Further, the function selecting unit 24 determines whether or not there is a subsequent page (step S23). The term "subsequent page" here denotes a next page in a substantial queue in which the mage data switching unit 25 generates, as described before. When it is determined that there is not a subsequent page by the determination of the step S23, processing is completed. On the other hand, when there is a subsequent page, it is determined whether or not the next page is a color page (step S25). When the next page is not a color page, it is determined to perform image forming of the next page also, with the image forming function for exclusive monochrome continued. Then, direction is made to the control unit 29 of the print engine 27 so as to perform image forming by the image forming function for exclusive monochrome. After that, routine is returned to step S23 to repeat determination on the further next page. The control unit 29 performs image forming of a monochrome page being an object in a state where the printing unit 131 is switched to the image forming function of for exclusive monochrome, according to the aforementioned direction.

On the other hand, as a result of the determination of the step S25, when the subsequent page is a color page, the function selecting unit 24 temporarily determines that image forming of the next page is performed by the image forming function for both color and monochrome (step S27). After that, routine proceeds to determination of S17. Determination of the step S27 is changeable according to conditions of the subsequent page. That is, when monochrome pages of not less than N pages continue according to the determination result of the subsequent page by determination of the next step S17 or later, it is changed to the image forming function for exclusive monochrome (step S21). Processing procedures of step S17 or later are already described.

By the above-mentioned processing, the function selecting unit 24 selects the image forming function of the printing unit 131 on the basis of order of each page in a substantial queue in which the image data switching unit 25 generates and determination result of the C/M determining unit with respect to each page.

Second Embodiment

The number of pages N for use in determination of the function selecting unit 24 in the first embodiment is a predetermined value. In this embodiment, the function selecting unit 24 selects image forming function on the basis of time for switching the image forming function and image forming speed for a color page and a monochrome page. In addition, in order to realize this embodiment, the MFP 1 includes the processing time memory unit 37 shown in FIG. 2.

Prior to determining processing of the image forming function described in the first embodiment, the function selecting unit 24 acquires time $T_{k->c}$ required for switching from the image forming function for exclusive monochrome to the image forming function for both color and monochrome, time $T_{c->k}$ required for switching from the image forming function for both color and monochrome to the image forming function for exclusive monochrome, time Tk required for printing per one page by the image forming function for exclusive monochrome, and time Tc required for printing per one page by the image forming function for both color and monochrome. Here, Tc is greater than Tk (referred to as "Tc>Tk"). Next, switching time "$T_{c->k}+T_{k->c}$" for switching the image forming function for both color and monochrome->for exclusive monochrome->for both color and monochrome, is obtained. This switching time is waste time required for switching the image forming function. On the other hand, if a monochrome page is printed by the image forming function for both color and monochrome, it requires more time than printing by the image forming function for exclusive monochrome. The reason is "Tc>Tk". This time is also waste time. Then, waste time due to accompanying switching and waste time due to printing by the image forming function for both color and monochrome are compared to obtain that it is more effective to switch the image forming function when how many monochrome pages continue. When monochrome pages of N pages are printed by the image forming function for exclusive monochrome, shortened time is "N×(Tc−Tk)", as compared with the case of printing by the image forming function for both color and monochrome. Consequently, the number of pages N in which printing time is shortened by switching to the image forming function for exclusive monochrome, that is, N which satisfies the relationship of "$N\times(Tc-Tk)>T_{c->k}+T_{k->c}$" is calculated. The calculated N is applied to the processing described in the first embodiment.

If, in doing so, only in cases in which time required for printing is shortened, the monochrome page can be printed by switching to the image forming function for exclusive monochrome. Therefore, efficient image forming processing can be implemented without spending waste time in switching the image forming function.

In addition, there is a case in which clearance between pages is different in the case where continuous monochrome pages are included in the same printing job and in the case where continuous monochrome pages extend over different printing jobs. For example, it is a case where former image data and latter image data are redirected. In this case, in order to switch a feeding path of sheets, there is a case to have clearance between the former page (final page of the former printing job) and the next page (beginning page of the latter printing job). More specifically, in an MFP 1 provided with a plurality of paper exit trays, it is a case to differentiate paper exit trays between a copy job and a print job to sort. Then, it is a case where the former printing job is the copy job and the latter (printing job is the print job. Value of N may be determined in view of such conditions. In this case, the processing time memory unit 37 stores time to be held for switching the paper exit trays. The image data switching unit 25 determines that predetermined clearance should be held between the relevant pages on the basis of image forming conditions of each page to inform the function selecting unit 24 of it. When extra time for holding page clearance is Txk by the image forming function for exclusive monochrome, Txc by the image forming function for both color and monochrome, Txk<Txc; and the number of times of switching the former images and the latter image is L, N which satisfies the relationship of "$N\times(Tc-Tk)+L\times(Txc-Txk)>T_{c->k}+T_{k->c}$" is calculated. The calculated N is applied to the processing described in the first embodiment.

Third Embodiment

This embodiment will be described on the case where the function selecting unit 24 selects image forming function on the basis of movement distance of a photoconductor during switching the image forming function and movement distance of a photoconductor required for image forming for a color page and a monochrome page. In addition, in order to realize this embodiment, the MFP 1 includes the movement distance memory unit 39 shown in FIG. 2.

Prior to determining processing of the image forming function described in the first embodiment, the function selecting unit 24 acquires distance $D_{k->c}$ in which a photoconductor moves when switching from the image forming function for exclusive monochrome to the image forming function for both color and monochrome, distance $D_{c->k}$ in which the photoconductor moves when switching from the image forming function for both color and monochrome to the image forming function for exclusive monochrome, movement distance Dk of the photoconductor required for printing per one page by the image forming function for exclusive monochrome, and movement distance Dc of the photoconductor required for printing per one page by the image forming function for both color and monochrome. Here, Dc is greater than Dk (Dc>Dk). Next, switching movement distance, "$D_{c->k}+D_{k->c}$" for switching the image forming function for both color and monochrome->for exclusive monochrome->for both color and monochrome, is obtained. This switching movemnt distance is waste movemnt distance required for switching the image forming function. On the other hand, if a monochrome page is printed by the image forming function for both color and monochrome, it spends more extra movemnt distance than printing by the image forming function for exclusive monochrome. The reason is "Dc>Dk." This is also waste movement distance. Then, waste movement distance due to accompanying switching and waste movement distance due to printing by the image forming function for both color and monochrome are compared to obtain that it is more effective to switch the image forming function when how many monochrome pages continue. When monochrome pages of N pages are printed by the image forming function for exclusive monochrome, shortened movement distance is "N×(Dc−Dk)," as compared with the case of printing by the image forming function for both color and monochrome. Consequently, the number of pages N in which movement distance is shortened by switching to the image forming function for exclusive monochrome, that is, N which satisfies the relationship of "$N\times(Dc-Dk)>D_{c->k}+D_{k->c}$" is calculated. The calculated N is applied to the processing described in the first embodiment.

If, in doing so, only in cases in which movement distance is shortened, the monochrome page can be printed by switching to the image forming function for exclusive monochrome. Therefore, degradation of the photoconductor can be suppressed without spending waste movement distance in switching the image forming function.

In addition, there is a case in which clearance between pages is different in the case where continuous monochrome pages are included in the same image data and in the case where continuous monochrome pages extend over different image data. For example, it is a case where former image data and latter image data are redirected. In this case, in order to switch a feeding path of sheets, there is a case to have clearance between the former page (final page of the former printing job) and the next page (beginning page of the latter printing job). Value of Dc, Dk may be determined in view of such conditions. In this case, the processing time memory unit 37 stores movement distance required for switching the conveyance path. The image data switching unit 25 determines that clearance between pages should be held on the basis of image forming conditions of each page to inform that predetermined clearance should be held between pages to the function selecting unit 24.

Fourth Embodiment

In this embodiment, configuration in which calculation method of N can switch between the methods described in the second embodiment and the third embodiment will be described. In addition, in order to correspond to this embodiment, the MFP 1 includes the selection condition switching unit 35, processing time memory unit 37, and movement distance memory unit 39 shown in FIG. 2.

Prior to determining processing of the image forming function described in the first embodiment, the function selecting unit 24 calculates the number of pages N. At this time, the function selecting unit 24 determines whether the image forming function is determined on the basis of the contents stored in the processing time memory unit 37 or the image forming function is determined on the basis of the contents stored in the movement distance memory unit 39 referring to the selection condition switching unit 35. Furthermore, the function selecting unit 24 refers the selection condition switching unit 35 when the print engine 27 in a waiting state starts to perform image forming receiving new image data.

Selection conditions held by the selection condition switching unit 35, for example, is set by a setting menu for a device keeper presented by the MFP 1. Alternatively, in order that the MFP 1 controls replacement time of a photoconductor, a photoconductor counter (not shown in the drawing) as a period control unit may be provided. The photoconductor counter counts periods in which respective photoconductor drums 101*a* to 101*d* are used after replacement. The selection condition switching unit 35 controls so as to determine the image forming function on the basis of the contents stored in the processing time memory unit 37 referring to the aforementioned photoconductor counter until value of the photoconductor counter is before a predetermined replacement time and reach previously set value. On the other hand, when the photoconductor counter reaches the predetermined value; the selection condition switching unit 35 switches so as to determine the image forming function on the basis of the contents stored in the movement distance memory unit 39. This can switch the image forming function so as to suppress degradation of the photoconductor when replacement time of the photoconductor comes close.

Fifth Embodiment

In this embodiment, processing of the case where the function selecting unit 24 selects image forming function on the basis of cumulative number of pages of monochrome pages and color pages will be described. In addition, this configuration corresponds to configuration shown in FIG. 3.

Figure 5:
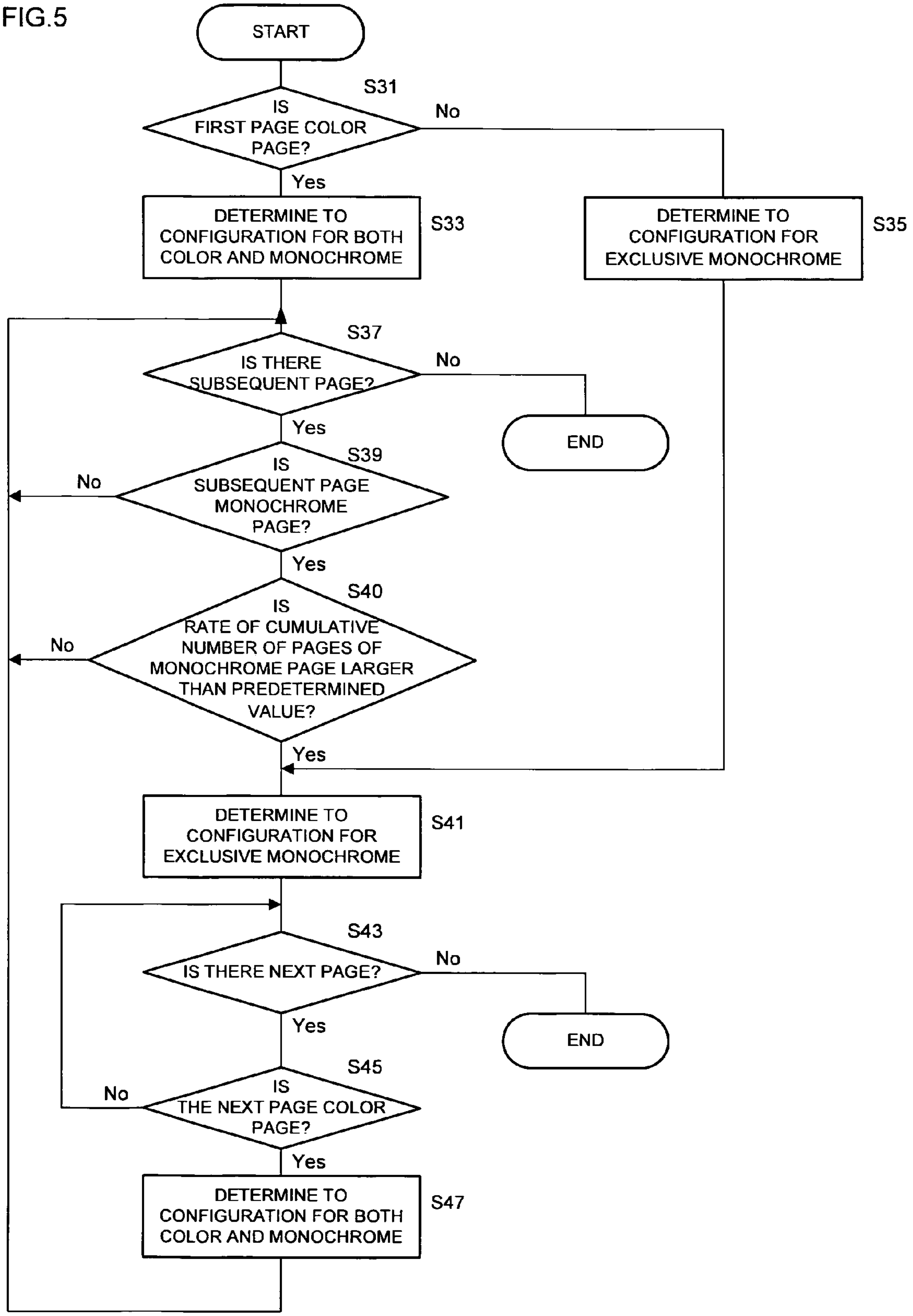
FIG. 5 is a flow chart showing an example of processing in which the function selecting unit 24 of the image forming apparatus shown in FIG. 3 selects configuration which performs image forming of respective pages.

FIG. 5 is a flow chart showing an example of processing in which the function selecting unit 24 of the image forming apparatus shown in FIG. 3 determines the image forming function of the printing unit. In the flow chart shown in FIG. 5, steps S31 to S37 correspond to steps S11 to S17 of the flow chart shown in FIG. 4, respectively. Furthermore, each step of steps S41 to S47 shown in FIG. 5 corresponds to each of the steps S21 to S27 shown in FIG. 4, respectively.

The function selecting unit 24 determines whether or not a subsequent page of a color page is a monochrome page, in step S39. When the subsequent page is not a monochrome page, direction is made to the control unit 29 of the print engine 27 so as to switch to the image forming function for both color and monochrome according to temporarily determined the image forming function. Then, routine returns to step S37 to repeat determination on further next page. The control unit 29 switches the image forming function of the printing unit 131 to the image forming function for both color and monochrome according to the aforementioned direction to perform image forming of an object page. Furthermore, cumulative number of pages of the cumulative number memory unit 33 is updated according to whether the image-formed page is a color page or a monochrome page.

On the other hand, when the subsequent page is a monochrome page in the determination of the aforementioned step S39, the function selecting unit 24 acquires cumulative number of pages Sk of the monochrome page and cumulative number of pages Sc of the color page from the cumulative number memory unit 33. Then, it is determined whether or not rate of the monochrome page "$Rk=Sk/(Sk+Sc)$" is lager than a predetermined value (step S40). When Rk is larger than the predetermined value, routine proceeds to step S41 to change the temporarily determined the image forming function for both color and monochrome and to determine to perform image forming of the relevant pages by the image forming function for exclusive monochrome. Then, direction is made to the control unit 29 of the print engine 27 so as to switch to the image forming function for exclusive monochrome to complete processing. The control unit 29 switches the image forming function of the printing unit 131 to the image forming function for exclusive monochrome to perform image forming of an object page according to the aforementioned direction. Furthermore, cumulative number of pages of the cumulative number memory unit 33 is updated according to whether the image-formed page is a color page or a monochrome page.

On the other hand, when Rk is not more than the predetermined value by the determination of the aforementioned step S40, direction is made so as to switch to the image forming function for both color and monochrome according to the temporarily determined the image forming function. Then, routine returns to step S37 to repeat determination on further next page. The control unit 29 switches the image forming function of the printing unit 131 to the image forming function for both color and monochrome to perform image forming of an object according to the aforementioned direction. Furthermore, cumulative number of pages of the cumulative number memory unit 33 is updated according to whether the image-formed page is a color page or a monochrome page.

The above-mention is description of the flow chart shown in FIG. 5.

It is understood that various modifications of the present invention other than the aforementioned embodiments will be possible. It should not be construed that such modifications depart from the features and scope of the present invention. It will be apparent to those of ordinary skill in the art that such modifications are intended to be included in the claims of the present invention.

What is claimed is:

1. An image forming apparatus comprising:

a plurality of image data acquisition units for respectively acquiring one or more page(s) of image data;

a color or monochrome determining unit for determining whether each of the acquired pages is in color or in monochrome;

an image forming unit for performing image formation of each page switchably using a monochrome-only image forming function for a monochrome page or a color and monochrome image forming function for a color page and a monochrome page;

an image data switching unit for sequentially selecting and arranging the acquired pages of image data one by one so that the image formation of each page is performed in the order of selection;

a function selecting unit for selecting either one of the monochrome-only and color and monochrome image forming functions for each of the arranged pages on the basis of the determination result made by the color or monochrome determining unit; and a control unit for controlling the image forming unit so that image formation of each page is performed using the selected image forming function;

a processing time memory unit for storing in advance time required for switching the image forming functions, time required for image formation of a monochrome page using the monochrome-only image forming function and time required for image formation of a monochrome page using the color and monochrome image forming function; and a movement distance memory unit for storing in advance a traveling distance of a photoconductor during switching between the image forming functions, a traveling distance of the photoconductor during the image formation of a monochrome page using the monochrome-only image forming function and a traveling distance of the photoconductor during the image formation of a monochrome page using the color and monochrome image forming function, wherein the image forming unit is of an electrophotographic type, wherein the function selecting unit comprises a selection condition switching unit for switching between a first selection mode and a second selection mode, when the one or more pages of image data include two color pages and one or more monochrome page(s) therebetween, wherein the first selection mode selecting either one of the image forming functions on the basis of the number of monochrome page(s) and the time required for switching and the respective image formation in the processing time memory unit so that quicker image formation of the monochrome page(s) is performed, and wherein the second selection mode selecting either one of the image forming functions on the basis of the number of the monochrome page(s) and the traveling distances stored in the movement distance memory unit so that image formation of the monochrome page(s) is performed with a shorter traveling distance of the photoconductor.

2. The image forming apparatus of claim 1, wherein the function selecting unit selects, when the one or more pages of image data include two color pages and more than a predetermined number of monochrome page(s) therebetween, the monochrome-only image forming function to perform image formation of the monochrome page(s), and selects, when the one or more pages of image data include two color pages and less than the predetermined number of monochrome page(s) therebetween, the color and monochrome image forming function to perform image formation of the monochrome page(s).

3. The image forming apparatus of claim 1, further comprising a cumulative number memory unit for storing cumulative numbers of monochrome pages and color pages subjected to image formation, respectively, wherein the function selecting unit calculates a proportion of the cumulative number of the monochrome pages to the cumulative number of the color pages stored in the cumulative number memory unit, and when the proportion is more than a predetermined value, selects the monochrome-only image forming function to perform image formation of a monochrome page and when the proportion is less than the predetermined value, selects the color and monochrome image forming function to perform the image formation of the monochrome page.

4. The image forming apparatus of claim 1, further comprising a period control unit for determining whether or not the photoconductor is used for a predetermined period of time, wherein when the photoconductor is used for the predetermined period of time, the selection condition switching unit switches from the first selection mode to the second selection mode.

* * * * *